(12) United States Patent
Cloud et al.

(10) Patent No.: US 8,902,048 B2
(45) Date of Patent: Dec. 2, 2014

(54) RADIO FREQUENCY TRANSMITTER ADAPTORS, METHODS AND ARTICLES OF MANUFACTURE

(75) Inventors: Neal Cloud, Tolono, IL (US); David Johnson, Champaign, IL (US); Kevin Waite, Urbana, IL (US); Zhou Zhenmin, Zhuhai (CN)

(73) Assignee: Hobbico, Inc., Champaign, IL (US)

( * ) Notice: Subject to any disclaimer, the term of this patent is extended or adjusted under 35 U.S.C. 154(b) by 263 days.

(21) Appl. No.: 13/309,219

(22) Filed: Dec. 1, 2011

(65) Prior Publication Data

US 2013/0142246 A1    Jun. 6, 2013

(51) Int. Cl.
*G08C 19/16*    (2006.01)
(52) U.S. Cl.
USPC ........................................ 340/12.13
(58) Field of Classification Search
CPC ........... A63H 30/04; G09B 9/048; G09B 9/08
USPC ................................ 446/454–456
See application file for complete search history.

(56) References Cited

U.S. PATENT DOCUMENTS

| | | | |
|---|---|---|---|
| 5,628,631 A | 5/1997 | Aneha | |
| 8,049,600 B2 | 11/2011 | Beard et al. | |
| 2005/0168658 A1* | 8/2005 | Woolgar et al. | 348/734 |
| 2008/0001773 A1* | 1/2008 | Rye et al. | 340/825.22 |
| 2009/0016728 A1 | 1/2009 | Kindle | |
| 2009/0207039 A1* | 8/2009 | Haijima | 340/825.22 |
| 2009/0282437 A1* | 11/2009 | Malec et al. | 725/40 |
| 2010/0168949 A1 | 7/2010 | Malecki et al. | |
| 2011/0077801 A1* | 3/2011 | Tanaka | 701/2 |
| 2011/0103429 A1 | 5/2011 | Tanaka et al. | |

OTHER PUBLICATIONS

Spektrum Air Module System user manual, 2007, pp. 2-31, Horizon Hobby, Inc., Champaign, IL.
Spektrum Air Module System user manual, Nov. 1, 2009, pp. 2-31, Horizon Hobby, Inc., Champaign, IL.
Spektrum Air Module System for Multiplex Royal EVO and Multiplex 3030 user manual, Oct. 9, 2009, pp. 29-55, Horizon Hobby, Inc., Champaign, IL.
DSM2 Airmodule with AR9000 Futaba-Compatible by Spektrum (SPMMSMZ9), downloaded Oct. 7, 2013 from <http://www.horizonhobby.com/Products/Default.aspx?ProdID=SPMMSMZ9>, 6 pages, Horizon Hobby, Inc., Champaign, IL.
Instruction Manual for Airplane and Helicopter: XP6102, 6-Channel Computer Radio System, 2003, pp. 1-90, Horizon Hobby, Inc., Champaign, IL/JR Products.
International Search Report and Written Opinion of the ISA/US issued in related application PCT/US2012/066817, Feb. 8, 2013, 6 pages.

* cited by examiner

*Primary Examiner* — Kerri McNally
*Assistant Examiner* — Thomas McCormack
(74) *Attorney, Agent, or Firm* — Drinker Biddle & Reath LLP

(57) ABSTRACT

Radio Frequency (RF) transmitter adaptors, methods and articles of manufacture are disclosed. A method of adapting an RF transmitter for using in controlling a radio controlled (R/C) device having an RF receiver includes receiving a pulse-position modulation (PPM) signal from the RF transmitter, automatically selecting a channel assignment map based on the PPM signal, and generating, from the PPM signal, an RF communication signal compatible with the RF receiver for use in controlling the R/C device based on the selected channel assignment map.

20 Claims, 5 Drawing Sheets

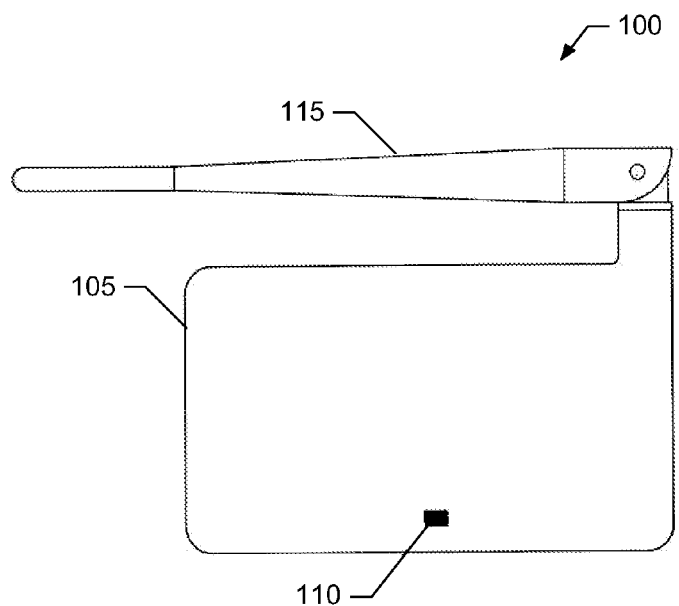
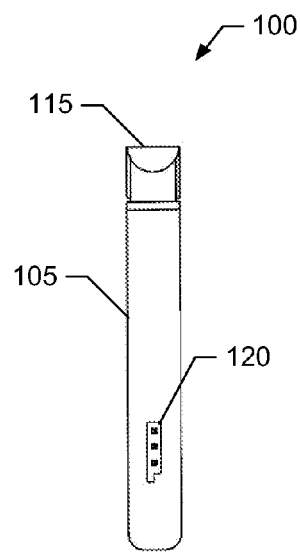
FIG. 1A  FIG. 1B
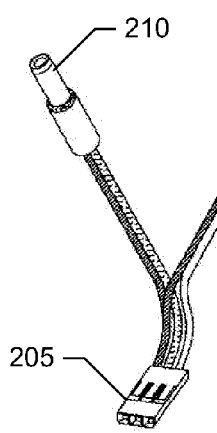
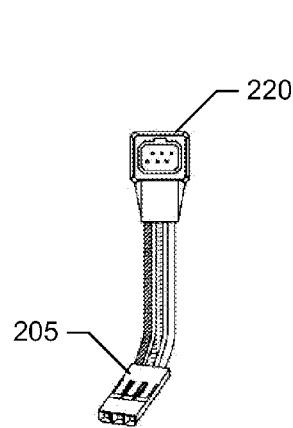
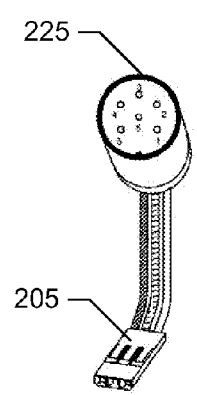
FIG. 2A  FIG. 2B  FIG. 2C

RADIO FREQUENCY TRANSMITTER ADAPTORS, METHODS AND ARTICLES OF MANUFACTURE

FIELD OF THE DISCLOSURE

This disclosure relates generally to radio frequency (RF) transmitters for radio controlled (R/C) hobby devices and, more particularly, to RF transmitter adaptors, methods, and articles of manufacture.

BACKGROUND

An RF transmitter may be used to control an R/C hobby device such as an airplane, car, helicopter, boat, truck, etc. As such, the RF transmitter includes one or more control elements (e.g., control sticks, switches, etc.) that allow a user to provide inputs representing movement(s) or action(s) to be taken by the R/C device. The RF transmitter converts those inputs into RF signals that are communicated wirelessly to the R/C device. At the R/C device, the RF signals are decoded and used to control one or more actuators or servos that cause the R/C device to effect the intended movement(s) or action(s).

BRIEF DESCRIPTION OF THE DRAWINGS

Features and advantages of this disclosure will become apparent in review of exemplary embodiments with reference to the attached drawings, in which:

FIGS. 1A and 1B are front and side views, respectively, of an example RF transmitter adaptor;

FIGS. 2A, 2B, and 2C are example cable assemblies that may be used to couple the RF transmitter adaptor of FIGS. 1A and 1B to an RF transmitter;

DETAILED DESCRIPTION

Figure 3A:
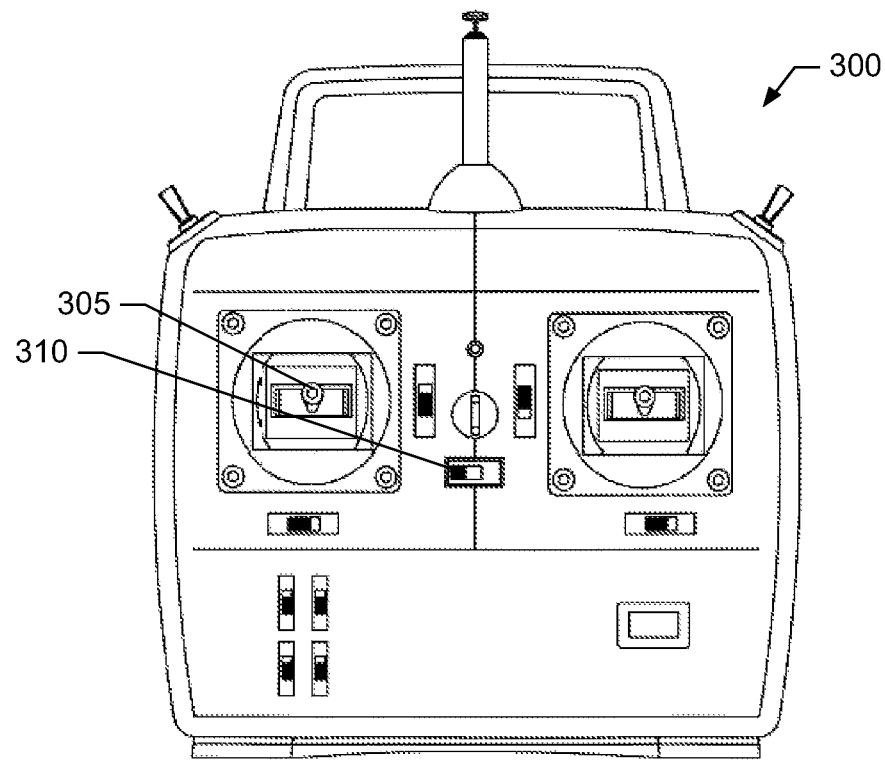
FIGS. 3A and 3B are front and back views of an example RF transmitter.

A lack of communication standards in the R/C model industry for 2.4 GHz-band RF products has caused manufacturers to develop proprietary sets of commands and communication technologies that are used to send control information over the RF communication link between their RF transmitters and their RF receivers. Accordingly, most manufacturers' RF transmitters are only compatible with their own RF receivers. Thus, a Brand A RF transmitter cannot be used to control a Brand B RF receiver. Therefore, if a user wishes to utilize different RF receivers in their R/C device(s), they need to purchase and use a different compatible RF transmitter. However, RF transmitters may represent a considerable expense and users are often intimately familiar with their RF transmitter(s). Thus, users may be reticent to invest in new RF receivers of a different brand even though they would provide advantages in the use and enjoyment of their R/C device(s).

RF transmitter adaptors, methods, and articles of manufacture that address at least these problems are disclosed herein. In general, disclosed embodiments enable users to use their current RF transmitter with RF receivers of a different brand. In disclosed embodiments, an RF transmitter adaptor converts control signals generated by an RF transmitter to form an RF signal that is compatible with a differently branded RF receiver. In various disclosed embodiments, RF transmitter adaptors are able to automatically detect the brand of an RF transmitter, automatically select a channel assignment map based on the detected brand, and perform channel mapping based on the channel assignment map between a first channel map used by the RF transmitter and a second channel map used by differently branded RF receivers. In some examples, an RF transmitter adaptor automatically detects the brand of an RF transmitter by detecting the channel associated with an active pulse-position modulation (PPM) signal (e.g., a minimum-throttle signal) when the RF transmitter adaptor is powered on. Alternatively, the RF transmitter adaptor may include one or more switches that enable a user to manually identify the brand of the RF transmitter and/or manually provide a channel assignment map.

Many available RF transmitters have a training port that allows a novice user who is receiving instruction from a teacher to attach, couple, or tether their own RF transmitter to the RF transmitter of the teacher. This permits the novice user to gain experience in controlling an R/C device (e.g., an airplane), while at the same time permitting the teacher to take over control of the R/C device from the novice user, if necessary.

Because the novice user and the teacher may not use the same brand of RF transmitter, the training port is used to transfer PPM signals prior to their modulation to an RF signal (and associated proprietary protocol). In contrast to the RF signals, the PPM signals are standardized across manufacturers, and thus can be used as a sort of universal "language" for controlling R/C devices, recognizing, however, that different devices may require different channel mappings.

Although the training port of an RF transmitter was originally intended for use by connecting to another RF transmitter operated by another user, this training port can be used to standardize control data across RF transmitters. Disclosed RF transmitter adaptors are coupled to the training port of any manufacturers' RF transmitter, receive the PPM signals produced by operation of the coupled RF transmitter by a user, modulate the PPM signals to form RF signals in accordance with a communication protocol implemented by one or more RF receivers, and transmit these RF signals to the RF receivers. In this way, any number of differently branded RF transmitters can be adapted to be compatible with the RF receivers.

Because different manufacturers use different trainer port connectors on their RF transmitters, RF transmitter adaptors disclosed herein utilize cable assemblies or adaptor cables that have a standardized plug on one end that is compatible with the RF transmitter adaptors, and a plug on an opposite end that is compatible with a particular manufacturer's RF transmitter trainer port. Thus, to use one of the RF transmitter adaptors disclosed herein, a user selects a cable assembly based on the brand of their RF transmitter and uses the selected cable assembly to couple their RF transmitter to the RF transmitter adaptor.

Exemplary embodiments will now be described more fully with reference to the accompanying drawings.

FIG. 1 is a schematic illustration of an example RF transmitter adaptor 100 that may be used to enable an RF transmitter to control differently branded RF receivers. In some examples, the RF transmitter adaptor 100 is the same brand as the RF receivers. The disclosed RF transmitter adaptor 100 may also be used to enable an RF transmitter (e.g., a non 2.4 GHz RF transmitter) to communicate with newer RF receivers of the same brand as the RF transmitter adaptor 100. The RF transmitter adaptor 100 includes a body 105 having a light-emitting diode (LED) 110, an antenna 115, and a connector 120.

As described below in connection with FIG. 5, a channel detector 505, a channel mapper 510, and an RF modulator 515 are implemented in the body 105. The body 105 may also include a speaker 520 to emit tones representing a channel assignment map automatically selected by the RF transmitter adaptor 100 or manually set by the user.

The status LED 110 may be used to provide a visible indication that the RF transmitter adaptor 100 is powered on and that the RF transmitter adaptor 100 is mapping control channels between an RF transmitter being adapted and RF receivers. For example, the status LED 110 may be active (e.g., turned on) when the RF transmitter adaptor 100 is active.

The antenna 115 is used to transmit RF control signals to RF receivers. Any type, shape, and configuration of antenna 115 suitable for transmitting RF control signals (e.g., 2.4 GHz RF signals) to R/C devices may be used.

The connector 120 communicatively couples the RF transmitter adaptor 100 to an RF transmitter. Because different brands of RF transmitters may have different connectors or ports associated with their training ports, different cable assemblies (see FIGS. 2A, 2B, and 2C) may be used to couple the RF transmitter adaptor 100 to the different brands of RF transmitters. To adapt a particular brand of RF transmitter, a user selects the cable assembly corresponding to their RF transmitter and couples their RF transmitter to the RF transmitter adapter 100 via the selected cable assembly. As shown in FIGS. 2A-C, each of the cable assemblies has at one end an identical plug 205 compatible with the connector 120 of the RF transmitter adaptor 100. The other end of each of the cable assemblies of FIGS. 2A-C has a plug specific to the brand of RF transmitter to be adapted. For example, FIG. 2A depicts a cable assembly for a JR® or Spektrum® brand RF transmitter having a power plug 210 and a training port plug 215, FIG. 2B depicts a cable assembly for a Futaba® brand RF transmitter having a square training port plug 220, and FIG. 2C depicts a cable assembly for a Futaba or Hitec® brand RF transmitter having a round training port plug 225. Other cable assemblies corresponding to the training ports of any other past, present or future RF transmitters may also be used.

Figure 3B:
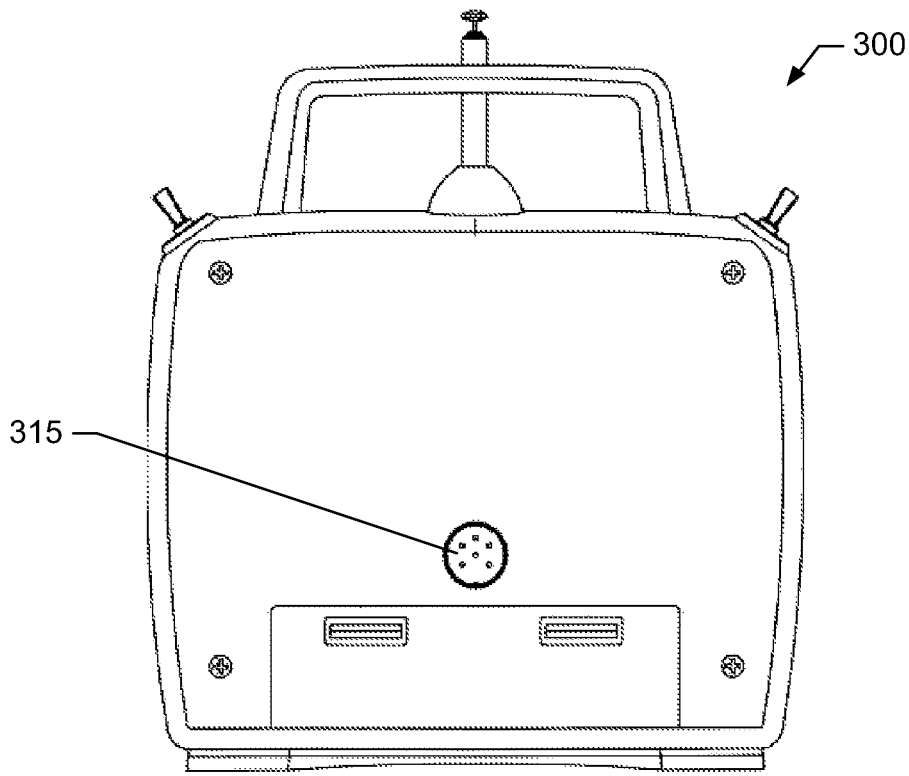

FIGS. 3A and 3B illustrate a front view and a back view, respectively, of an example RF transmitter 300. As depicted in FIG. 3A, the RF transmitter 300 has any number and/or types of control elements such as a throttle/rudder stick 305 and an on/off switch 310. As depicted in FIG. 3B, the RF transmitter 300 has a training port 315 usable to couple the RF transmitter 300 to the RF transmitter adaptors disclosed herein. Some brands of RF transmitters 300 also have a power port (not shown) in lieu of providing power via the training port 315.

Figure 4:
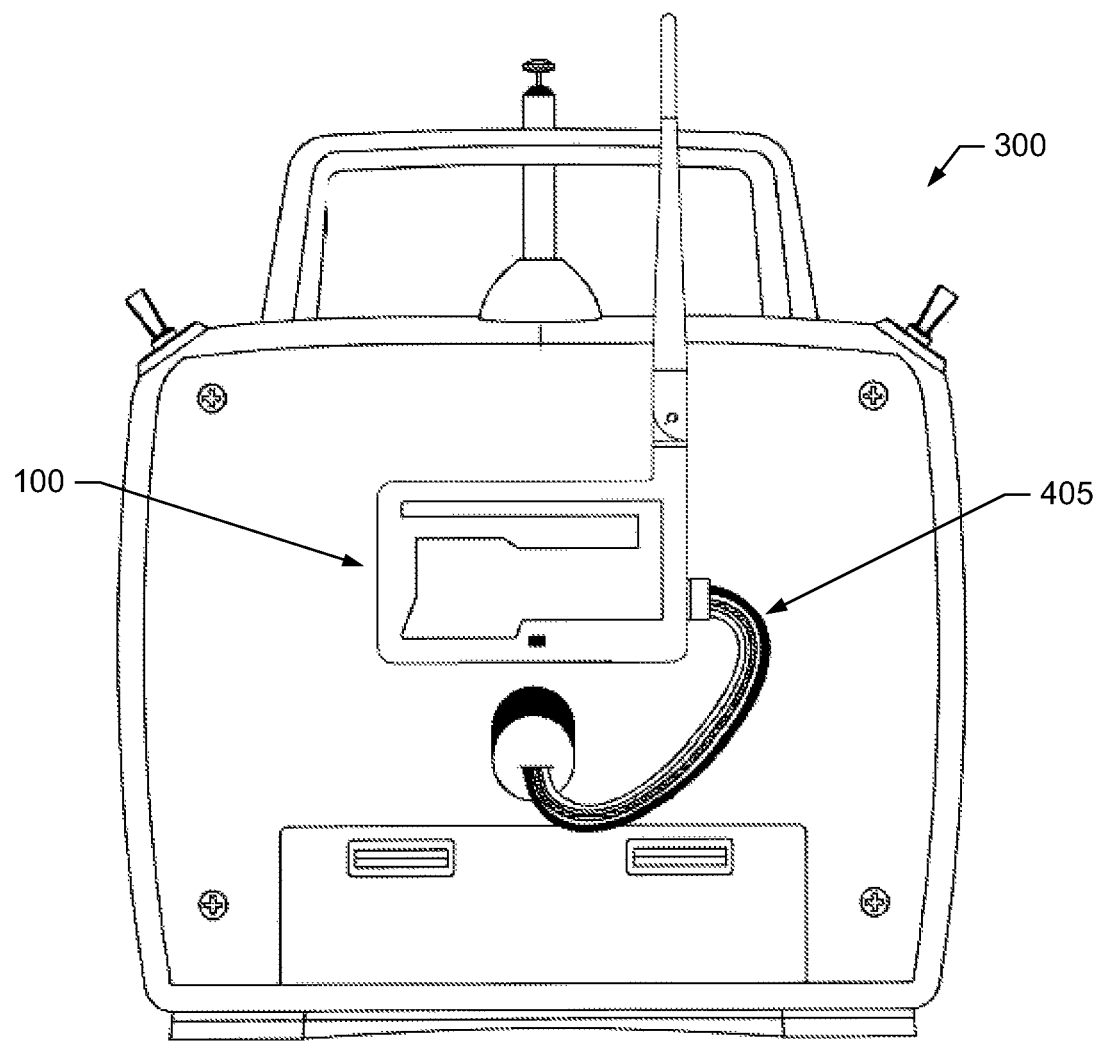
FIG. 4 is a back view of the RF transmitter of FIGS. 3A and 3B connected to the RF transmitter adaptor of FIGS. 1A and 1B.

FIG. 4 depicts the example RF transmitter 300 of FIGS. 3A and 3B coupled to the RF transmitter adaptor 100. As shown in FIG. 4, the RF transmitter adaptor 100 is coupled to the RF transmitter 300 via a cable assembly 405. The cable assembly 405 connects at one end to the connector 120 of the RF transmitter adaptor 100 (FIG. 1) and at the other end to the training port 315 of the RF transmitter 300 (FIG. 3B). The cable assembly 405 may be selected from the example cable assemblies of FIGS. 2A-C. The RF transmitter adaptor 100 may be affixed to the backside of the RF transmitter 300 using any number and/or type(s) of connecting mechanisms such as hook-and-loop fasteners, tape, double-sided tape, adhesive, glue, or the like. Although, preferably, the affixing is non-permanent. Additionally or alternatively, physical connectors such as clips, screws, bands, clamps, etc. may be used to affix the RF transmitter adaptor 100 to the RF transmitter 300.

Figure 5:
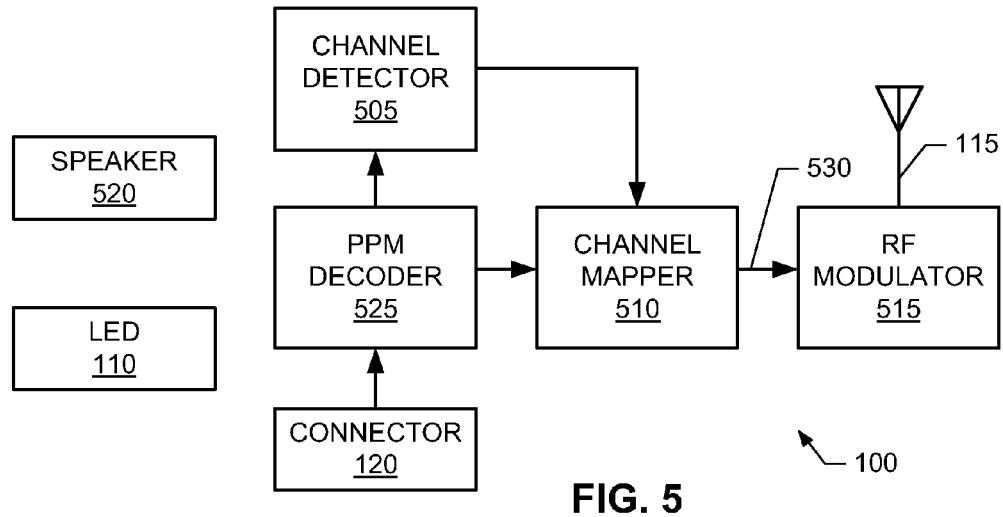
FIG. 5 is a block diagram illustrating an exemplary manner of implementing the RF transmitter adaptor of FIGS. 1A, 1B, and 4.

FIG. 5 illustrates an example manner of implementing the RF transmitter adaptor 100 of FIGS. 1A, 1B, and 4. To provide visual status indications (e.g., powered-on and active), the RF transmitter adaptor 110 includes the example LED 110. To provide audio status indications (e.g., to indicate which channel assignment map is selected), the RF transmitter adaptor 110 may include the example speaker 520. To couple the RF transmitter adaptor 100 to an RF transmitter (e.g., the RF transmitter 300 of FIGS. 3A and 3B), the RF transmitter adaptor 100 includes the example connector 120.

To decode PPM signals received via the connector 120, the RF transmitter adaptor 100 includes a PPM decoder 525. Using any number and/or type(s) of methods, algorithms, and/or logic elements, the example PPM decoder 525 decodes PPM signals received via the connector 120 to extract control information contained in the PPM signals.

In disclosed examples, a user, during power on of the RF transmitter adaptor 100, holds a particular control element of their RF transmitter (e.g., the throttle/rudder stick 305 of FIG. 3A) in a particular position (e.g., a minimum-throttle neutral-rudder position). By doing so, the user causes their RF transmitter to send a particular control signal (e.g., the minimum-throttle control pulse) in a pulse of the PPM signal received by the RF transmitter adaptor 100 via the connector 120. The pulse containing the particular control signal (e.g., the minimum-throttle control pulse) depends on the brand of the RF transmitter. For example, Futaba and Hitec RF transmitters send throttle control information in pulse 3, and JR and Spektrum RF transmitters send throttle control information in pulse 1. Other PPM signal characteristics may be used in addition to or instead of the PPM pulse detection to identify the brand of the RF transmitter. For example, PPM frame length and/or PPM peak-to-peak voltage may be used in addition to or instead of PPM pulse detection to identify the brand of the RF transmitter.

To automatically identify the brand of a coupled RF transmitter, the RF transmitter adaptor 100 includes the example channel detector 505. When the RF transmitter adaptor 100 is powered on, the example channel detector 505 identifies which pulse contains the particular control signal (e.g., the minimum-throttle control pulse), and identifies the brand of the coupled RF transmitter based on the identified pulse. For example, if throttle control information is found in pulse 3, the channel detector 505 identifies the RF transmitter as a Futaba or Hitec RF transmitter and, if the throttle control information is identified in pulse 1, the channel detector 505 identifies the RF transmitter as a JR or Spektrum RF transmitter.

The channel detector 505 causes the speaker 520 to emit one or more tones or beeps that represent the identified brand of RF transmitter. For example, a single beep may be used to signify a Futaba or Hitec RF transmitter was identified, and two beeps may be used to signify that a JR or Spektrum RF transmitter was identified.

In some embodiments, an additional or alternative PPM signal can be used to trigger a manual change of the detected brand of the RF transmitter. For example, during power on of the RF transmitter adaptor 100 a user may hold a particular control element of their RF transmitter (e.g., the throttle/rudder stick 305 of FIG. 3A) in another particular position (e.g., a minimum-throttle right-rudder position, a minimum-throttle left-rudder position, a neutral-throttle right-rudder position, a neutral-throttle left-rudder position or any other active rudder position). By doing so, the user causes their RF transmitter to send a first control signal (e.g., the minimum-throttle control pulse) in a first pulse of the PPM waveform and a second control signal (e.g., an active rudder control pulse) in a second pulse of the PPM waveform received by the RF transmitter adaptor 100 via the connector 120. The pulses containing the control signals will depend on the brand of the RF transmitter.

When the RF transmitter adaptor 100 is powered on, the example channel detector 505 detects that the second control signal (e.g., the active rudder control pulse) is being received and, rather than automatically identifying the brand of the coupled RF transmitter based on the first control signal (e.g., the minimum-throttle control pulse) changes a previously identified RF transmitter brand to the next RF transmitter brand in a list of possible RF transmitter brands. Alternatively, the second control signal can be used to select from a list of alternative channel assignment maps rather than selecting an alternative RF transmitter brand. Thus, if the automatically identified RF transmitter brand (or channel assignment map) is not correct (e.g., because a user is not using an RF transmitter's default channel mapping), a user can manually change the RF transmitter brand (or channel assignment map) subsequently used to perform channel mapping.

To translate or map between channel assignments, the RF transmitter adaptor 100 includes the example channel mapper 510. Based on the RF transmitter brand identified by the channel detector 505, the channel mapper 510 selects a channel assignment map. Table 1 (below) illustrates two example channel map assignments. Using the selected channel assignment map, the channel mapper 510 translates or maps PPM control information received via the connector 120 to form a control signal 530 having a channel assignment corresponding to the RF receivers. For example, if a JR RF transmitter is detected, the channel mapper 510 maps PPM control information received in channel 1 (throttle control information) into channel 3 of the control signal 530.

TABLE 1

Channel Map Assignments

| Input Channel | Futaba Hitec | JR and Spektrum | Output Channel | |
|---|---|---|---|---|
| 1 | Aileron | Throttle | 1 | Aileron |
| 2 | Elevator | Aileron | 2 | Elevator |
| 3 | Throttle | Elevator | 3 | Throttle |
| 4 | Rudder | Rudder | 4 | Rudder |

To create an RF control signal, the RF transmitter adaptor 100 includes the example RF modulator 515. The RF modulator 515 modulates the control signal to form an RF signal in accordance with the RF format, commands, and/or protocols developed by the manufacturer of the RF receivers. The RF signal is transmitted via the antenna 115.

While an example RF transmitter adaptor 100 is illustrated in FIGS. 1A, 1B, 4, and 5, any of the illustrated elements may be combined, divided, re-arranged, omitted, eliminated, and/or implemented in any other way. For example, the PPM decoder 525, the channel detector 505, the channel mapper 510, and the RF modulator 515 may be implemented by one or more of a processor, circuit(s), a programmable processor, fuses, an application-specific integrated circuit (ASIC), a programmable logic device (PLD), a field-programmable logic device (FPLD), a field-programmable gate array (FPGA), etc. When any embodiment of this disclosure is interpreted to cover a purely software and/or firmware implementation, at least one of the PPM decoder 525, the channel detector 505, the channel mapper 510, and the RF modulator 515 is expressly defined to include a tangible or non-transitory article of manufacture such as a computer-readable storage medium storing machine-readable instructions such as the firmware and/or software. The RF transmitter adaptor 100 may include elements instead of, or in addition to, those illustrated, and/or may include more than one of any or all of the illustrated elements.

Figure 6:
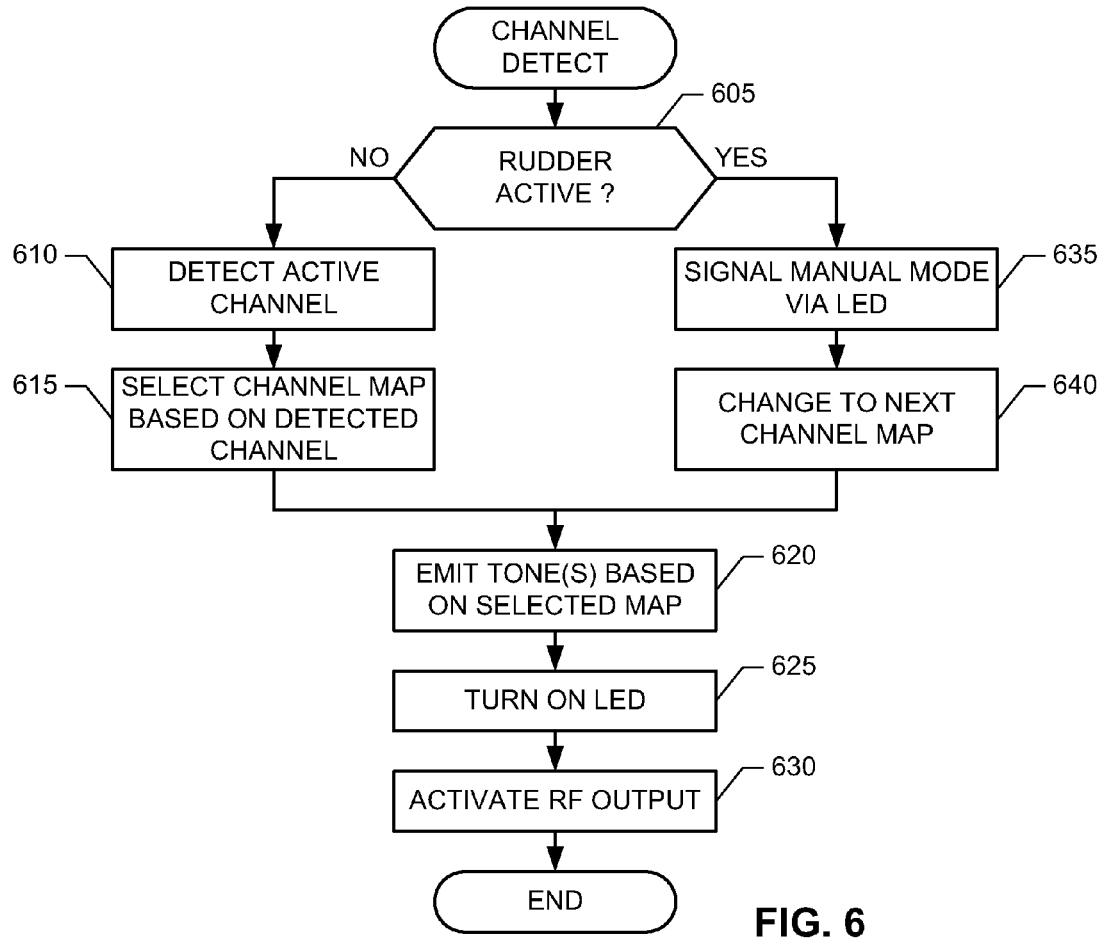
FIG. 6 is a flowchart illustrating an example process that may, for example, be embodied as machine-readable instructions executed by one or more processors to implement the RF transmitter adaptors disclosed herein.

FIG. 6 is a flowchart of an example process that may, for example, be implemented as instructions carried out by one or more processors to implement the RF transmitter adaptors disclosed herein. The example process of FIG. 6 may be embodied in program code and/or computer-readable instructions stored on a tangible or non-transitory machine-readable medium accessible by a processor, a computer, and/or other machine having a processor. Computer-readable instructions comprise, for example, instructions that cause a processor, a computer, and/or a machine having a processor to perform one or more particular processes. Alternatively, some or all of the example process may be implemented using any combination of fuses, ASIC(s), PLD(s), FPLD(s), FPGA(s), discrete logic, hardware, and firmware.

The example process of FIG. 6 begins with the channel detector 505 determining whether the second control signal (e.g., the active rudder control pulse) is active (block 605). If the second control signal is not being received (block 605), the channel detector 505 detects the pulse in which the first control signal (e.g., the minimum-throttle pulse) is being received (block 610). The channel mapper 510 selects a channel assignment map based on the brand of RF transmitter associated with the detected pulse of the first control signal (block 615).

The speaker 520 emits one or more tones corresponding to the identified RF transmitter brand (block 620) and the LED 110 is turned on to indicate the RF transmitter adaptor 100 is active and configured (block 630). The channel mapper 510 and RF modulator 515 are activated so that the RF transmitter can be used to control an R/C device (block 635). Control then exits from the example process of FIG. 6.

Returning to block 605, if the second control signal (e.g., the active rudder control pulse) is active (block 605), the LED 110 blinks, for example, three times to signify that a manual change in channel assignment map is being made (block 635). The channel mapper 510 selects the next channel assignment map in a list of channel assignment maps (block 640) and control proceeds to block 620. In some examples, the speaker 520 emits one or more tones or beeps in block 640 corresponding to the newly selected channel assignment map or corresponding RF transmitter brand.

Figure 7:
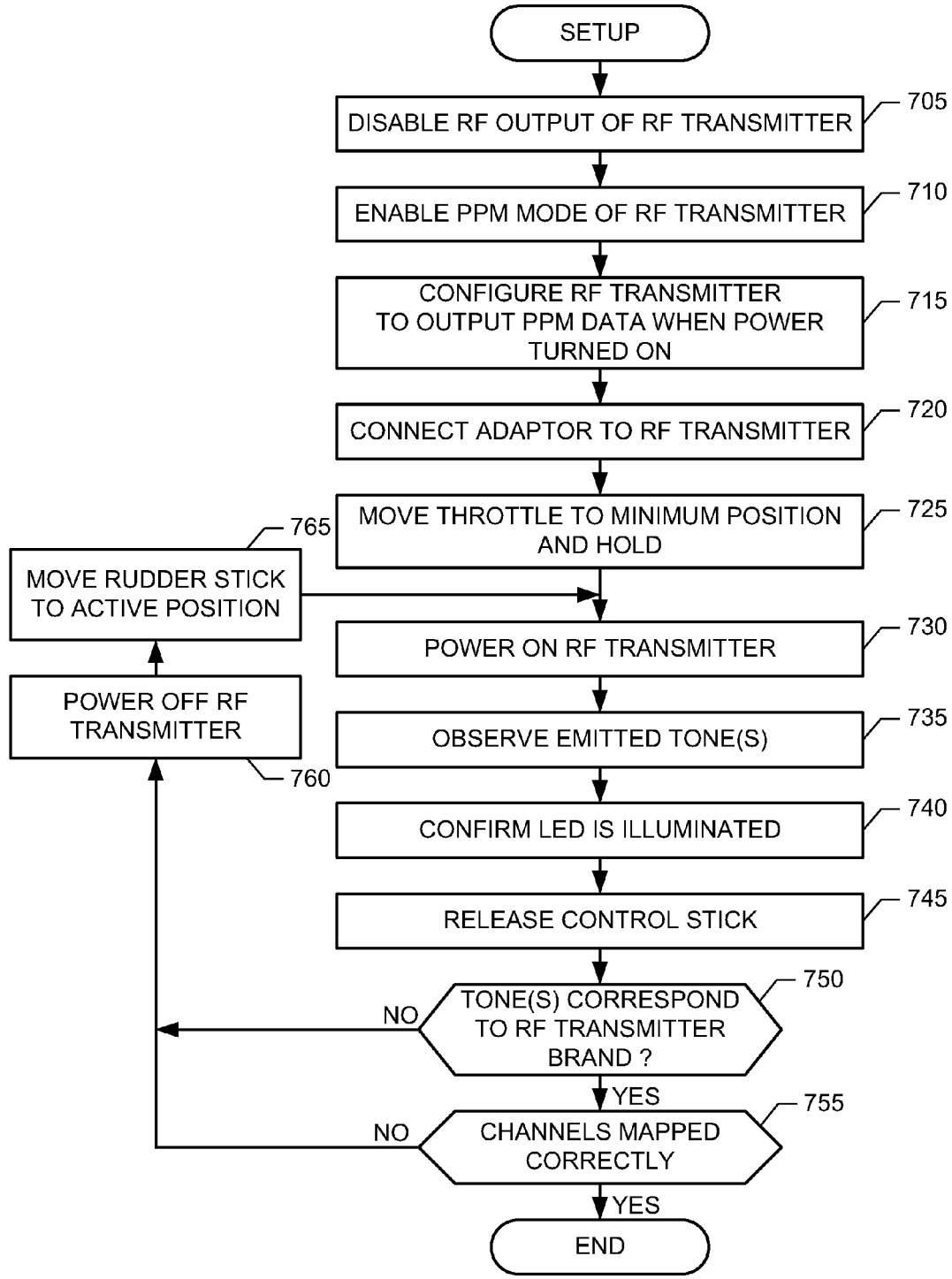
FIG. 7 is a flowchart illustrating an example process that may be carried out by, for example, a user to adapt an RF transmitter using the example RF transmitter adaptors disclosed herein.

FIG. 7 is a flowchart of an example process that may, for example, be carried out by a user of an RF transmitter (e.g., the example RF transmitter 300 of FIGS. 3A, 3B, and 4) to adapt the RF transmitter using any of the RF transmitter adaptors disclosed herein. The example process of FIG. 7 begins with the user disabling RF output by the RF transmitter, if possible (block 705), enabling PPM mode on the RF transmitter (block 710), and configuring the RF transmitter to begin transmitting when powered on (block 715).

The user connects the RF transmitter to the RF transmitter adaptor using, for example, one of the cable assemblies of FIGS. 2A-C (block 720). The user moves a control element (e.g., the throttle/rudder stick 305) to a first position (e.g., the minimum-throttle neutral-rudder position) (block 725) and powers on the RF transmitter, which preferably provides power to RF transmitter adaptor via the cable assembly (block 730).

The user observes (e.g., listens to) the tone(s) emitted to represent the brand of RF transmitter automatically identified by the RF transmitter adaptor (block 735). When the user confirms that the LED 110 is active (e.g., illuminated) (block 740), the user can release the control element (block 745).

If the emitted tones correspond to the actual brand of the RF transmitter (block 750) and use of the adapted RF transmitter results in proper operation of the R/C device (block 755), the process of FIG. 7 is ended.

If either the emitted tones do not correspond to the actual brand of the RF transmitter (block 750) or use of the adapted RF transmitter does not result in proper operation of the R/C device (block 755), the user powers off the RF transmitter (block 760) and moves the control element to a second different position (e.g., the minimum-throttle active rudder position) (block 765) and returns to block 730 to manually change the RF transmitter brand or channel assignment map in the RF transmitter adaptor.

The embodiments disclosed herein may include a memory for storing program data, a processor for executing the program data to implement the methods and apparatus disclosed herein, a permanent storage such as a disk drive, a communication port for handling communication with other devices, and user interface devices such as a display, a keyboard, a mouse, etc. When software modules are involved, these software modules may be stored as program instructions or computer-readable codes, which are executable by the processor, on a non-transitory or tangible computer-readable media such as a read-only memory (ROM), a random-access memory (RAM), a compact disc (CD), a digital versatile disc (DVD), a magnetic tape, a floppy disk, an optical data storage device, an electronic storage media (e.g., an integrated circuit (IC), an electronically erasable programmable read-only memory (EEPROM), or a flash memory), a quantum storage device, a cache, and/or any other storage media in which information may be stored for any duration (e.g., for extended time periods, permanently, for brief instances, for temporary buffering, and/or for caching). As used herein, a computer-readable storage medium expressly excludes any computer-readable media on which signals may be propagated. However, a computer-readable storage medium may include internal signal traces and/or internal signal paths carrying electrical signals thereon.

Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of this disclosure, reference has been made to the embodiments illustrated in the drawings, and specific language has been used to describe these embodiments. However, no limitation of the scope of this disclosure is intended by this specific language, and this disclosure should be construed to encompass all embodiments that would normally occur to one of ordinary skill in the art in view of this disclosure.

Disclosed embodiments may be described in terms of functional block components and various processing steps. Such functional blocks may be realized by any number of hardware and/or software components configured to perform the specified functions. For example, the embodiments may employ various integrated circuit components (e.g., memory elements, processing elements, logic elements, look-up tables, and the like) that may carry out a variety of functions under the control of one or more processors or other control devices. Similarly, where the elements of the embodiments are implemented using software programming or software elements the embodiments may be implemented with any programming or scripting language such as C, C++, Java, assembler, or the like, using any combination of data structure(s), object(s), process(es), routine(s), and other programming elements. Functional aspects may be implemented as instructions executed by one or more processors. Furthermore, the embodiments could employ any number of conventional techniques for electronics configuration, signal processing, control, data processing, and the like. The words "mechanism" and "element" are used broadly and are not limited to mechanical or physical embodiments, but can include software routines in conjunction with processors, etc.

The particular implementations shown and described herein are illustrative examples and are not intended to otherwise limit the scope of this disclosure in any way. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections might be present in a practical device. Moreover, no item or component is essential to the practice of the embodiments unless the element is specifically described as "essential" or "critical".

The use of the terms "a," "an," "the," and similar referents in the context of describing the embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. Moreover, one or more of the blocks and/or interactions described may be changed, eliminated, sub-divided, or combined; or any or all of the process may be carried out sequentially and/or carried out in parallel by, for example, separate processing threads, processors, devices, discrete logic, circuits, etc. The examples provided herein and the exemplary language (e.g., "such as" or "for example") used herein are intended merely to better illuminate the embodiments and does not pose a limitation on the scope of this disclosure unless otherwise claimed. In view of this disclosure, numerous modifications and adaptations will be readily apparent to those skilled in this art without departing from the spirit and scope of this disclosure.

While RF transmitter adaptors, methods, and articles of manufacture have been particularly shown and described with reference to exemplary embodiments thereof, it will be understood by those of ordinary skill in the art that various changes in form and details may be made therein without departing from the spirit and scope of this disclosure.

What is claimed is:

1. A method of adapting a radio frequency (RF) transmitter for use in controlling a radio controlled (R/C) device having an RF receiver, the method comprising:
   receiving a pulse-position modulation (PPM) signal from the RF transmitter, wherein the PPM signal is a control signal for the R/C device, the control signal having a plurality of pulses based on a first channel assignment associated with the RF transmitter;
   identifying, based on the PPM signal, which pulse of the plurality of pulses of the PPM signal contains a particular active control signal;
   automatically selecting a channel assignment map based on the identified pulse of the plurality of pulses of the PPM signal; and
   generating, from the PPM signal, an RF communication signal compatible with a second channel assignment associated with the RF receiver for use in controlling the R/C device based on the selected channel assignment map.

2. A method as defined in claim 1, wherein the RF communication signal is different than a second RF communication signal that the RF transmitter is configurable to generate for the PPM signal.

3. A method as defined in claim 1, wherein automatically selecting the channel assignment map based on the identified pulse of the plurality of pulses of the PPM signal comprises:
   selecting the channel assignment map from two or more channel assignment maps based on whether the identified pulse that contains the particular active control signal is the first pulse of the plurality of pulses or the third pulse of the plurality of pulses.

4. A method as defined in claim 3, wherein the particular active control signal represents a throttle stick held in a minimum position;
   wherein identifying which pulse of the plurality of pulses of the PPM signal comprises identifying which pulse of the plurality of pulses of the PPM signal contains the particular active control signal that represents the throttle stick held in the minimum position.

5. A method as defined in claim 3, further comprising changing the channel assignment map to a second different channel assignment map, when another pulse of the plurality of pulses of the PPM signal contains second active control information.

6. A method as defined in claim 1, wherein the control signal comprises a first control signal, wherein generating the RF communication signal comprises:
   forming a second control signal by translating, based on the selected channel assignment map, between the first channel assignment associated with the RF transmitter and the second channel assignment associated with the RF receiver; and
   modulating the second control signal to form the RF communication signal.

7. A method as defined in claim 1, emitting one or more tones representing the selected channel assignment map.

8. A method as defined in claim 1, further comprising automatically selecting the channel assignment map when a power-on is detected.

9. A tangible article of manufacture storing machine-readable instructions that, when executed, cause a machine to at least carry out the method of claim 1.

10. An adaptor for a radio frequency (RF) transmitter for a radio controlled (R/C) device, the adaptor comprising:
    a connector having an input that receives a pulse-position modulation (PPM) signal from the RF transmitter, wherein the PPM signal is a first control signal for the R/C device, the first control signal having a plurality of pulses based on a first channel assignment associated with the RF transmitter;
    a channel detector having an input that receives the PPM signal, the channel detector to identify a brand of the RF transmitter based on an identification of which pulse of the plurality of pulses of the PPM signal contains a particular active control signal;
    a channel mapper having an output that provides a second control signal by translating, based on the identified brand, between the first channel assignment associated with the RF transmitter and a second channel assignment associated with the RF receiver; and
    an RF modulator having RF modulation circuitry that modulates the second control signal to form an RF communication signal for use in controlling the R/C device;
    wherein the channel detector identifies, based on the PPM signal, which pulse of the plurality of pulses of the PPM signal contains the particular active control signal, wherein the identified pulse corresponds to the brand of the RF transmitter;
    wherein the channel mapper selects a channel assignment map from two or more channel assignment maps based on the identified pulse of the plurality of pulses of the PPM signal.

11. An adaptor as defined in claim 10, wherein the RF communication signal is different than a second RF communication signal that the RF transmitter is configurable to generate for the PPM signal.

12. An adaptor as defined in claim 10, wherein the active control information represents a throttle stick held in a minimum-throttle position.

13. An adaptor as defined in claim 10, wherein the channel mapper changes a channel assignment map to a different channel assignment map when a second pulse of the PPM signal contains second active control information.

14. An adaptor as defined in claim 10, further comprising a speaker that emits one or more tones representing the identified brand.

15. An adaptor as defined in claim 10, wherein the channel detector identifies the brand when the adaptor is powered on.

16. An adaptor kit comprising the adaptor as defined in claim 10, and two or more different cables to couple the connector to a selected one of two or more different RF transmitters.

17. A method of using an adaptor for a radio frequency (RF) transmitter for a radio controlled (R/C) device, the method comprising:
    selecting one of two or more cables based on a connector of the RF transmitter;
    coupling the adaptor to the RF transmitter using the selected cable; and
    applying power to the adaptor while holding a control element of the RF transmitter in a first particular position to provide, from the RF transmitter to the adaptor, a pulse-position modulation (PPM) signal having a particular active control signal that corresponds to the first particular position, wherein the PPM signal triggers the adaptor to automatically identify a channel assignment associated with the RF transmitter based on an identification of which pulse of a plurality of pulses of the PPM signal contains the particular active control signal, wherein the pulse identification is based on the PPM signal.

18. A method as defined in claim 17, further comprising:
validating the identified channel assignment; and
when the identified channel assignment is not valid:
  powering off the adaptor; and
  applying power to the adaptor while holding a second control element of the RF transmitter in a second particular position to trigger the adaptor to change the channel assignment to a second different channel assignment.

19. A method as defined in claim 18, wherein the control element comprises a throttle/rudder stick, the first particular position comprises a minimum-throttle and neutral-rudder position, the second control element comprises the throttle/rudder stick, and the second particular position comprises a minimum-throttle and active rudder position.

20. The method as defined in claim 1, wherein receiving the PPM signal comprises:
  receiving a PPM signal from the RF transmitter that corresponds to a particular trigger position of a control element of the RF transmitter;
  wherein identifying the pulse of the PPM signal comprises:
  identifying a pulse of the PPM signal containing active control information that corresponds to the particular trigger position.

* * * * *